United States Patent [19]

Herman

[11] Patent Number: 4,565,010

[45] Date of Patent: Jan. 21, 1986

[54] ELECTRONIC SIGNALING LEVEL

[76] Inventor: Robert D. Herman, 4720 S. Greenwood, Chicago, Ill. 60615

[21] Appl. No.: 499,345

[22] Filed: May 31, 1983

[51] Int. Cl.$^4$ .............................................. G01C 9/06
[52] U.S. Cl. ...................................... 33/366; 33/344; 33/402; 340/689
[58] Field of Search ........................ 33/366, 402, 344; 340/671, 678, 689

[56] References Cited

U.S. PATENT DOCUMENTS

| | | | |
|---|---|---|---|
| 723,526 | 3/1903 | Hein | 33/366 |
| 3,359,550 | 12/1967 | Christensen | 33/366 X |
| 3,657,551 | 4/1972 | Lingert et al. | 33/366 |
| 4,159,577 | 7/1979 | Bergkvist | 33/366 |
| 4,253,242 | 3/1981 | McInerney | 33/366 |
| 4,375,727 | 3/1983 | McAdams | 33/402 |

*Primary Examiner*—William D. Martin, Jr.

*Attorney, Agent, or Firm*—Alexander, Unikel, Bloom, Zalewa & Tenenbaum Ltd.

[57] ABSTRACT

An angular orientation detector and indicator has a plumb bob suspended in a vertically extending chamber of a housing. A beam of radiation is emitted across the chamber from a beam emitter to a beam receiver and the plumb bob is swingable through a beam path extending between the emitter and receiver. When the housing of the detector is positioned in a preselected angular orientation the plumb bob comes to rest blocking the beam path to substantially reduce or prevent the radiated beam from being received by the receiver. An electrically actuated signal, such as an audible or visual signal, or both, is thereby actuated to indicate that the detector is at a preselected angular orientation. Such detectors may be mounted on builder's levels to indicate when the level is in a preselected angular orientation, such as a horizontal or vertical orientation. Other embodiments and useful applications of such detectors are also disclosed.

19 Claims, 20 Drawing Figures

ELECTRONIC SIGNALING LEVEL

BACKGROUND OF THE INVENTION

1. Field of the Invention

This invention is generally concerned with instruments for determining positions and more particularly concerned with an instrument for determining true horizontal or true vertical positions of various objects.

2. Prior Art

An instrument well known to most people for indicating horizontal or vertical positions of objects is the conventional builder's level. The existing levels are sufficiently accurate for either construction or scientific applications and generally comprise a rectangular elongated frame, made of metal or wood, and containing one or more glass tubes filled with alcohol, except for a small curved bubble. The glass tubes are arranged on the frame in such way as to indicate either a vertical or horizontal positioning of the object against which the frame is abutted. The mid-portion of each glass tube is provided with an adjoining pair of lines which can be etched or painted on the tube. If the object is level, the air bubble comes to rest centered between the two lines.

This type of level, commonly called a "spirit level", has remained virtually unchanged for many years. Its primary deficiency is that it is difficult to read. The glass tube is typically less than two (2") inches long and the bubble is typically less than ⅜ths of an inch wide. Poor light conditions (too bright or too dim) or poor eyesight may make it difficult or impossible to read. Even if the user has good eyesight, it is still uncertain whether a clear bubble, in an almost-clear liquid, has come to rest perfectly centered between two fine lines.

Furthermore, the spirit level cannot be read, at all, at a distance further away than about eighteen inches (18"), even with good eyes under good light conditions. Yet, the spirit level must often be used in dimly lighted places where the eyes cannot easily follow it (for example, an overhead beam or a joist below the floor level). A carpenter may wish to place his level at the center of a long beam (for accuracy), but then he will have to adjust the position of the beam from its end, many feet away. To overcome in part the foregoing disadvantage, some of the spirit levels are provided with a small light source to facilitate reading, however, even a flashlight will not make it readable from a distance.

Some levels, presently available on the market, have been provided with light or sound devices which indicate visually or aurally when a true horizontal or true vertical position is achieved. For example, U.S. Pat. No. 3,233,235 describes a signaling level which uses a pendulum provided with a magnet pointer for closing an electric circuit to provide a signal that a true vertical or true horizontal has been indicated.

Another form of a level using a pendulum is described in U.S. Pat. No. 4,094,073, wherein a weighted pendulum achieves a contact in an electrical circuit to give a signal for a true horizontal or vertical positioning. In another form of a level, U.S. Pat. No. 4,094,073, there is described an angle detector using a weighted pendulum.

In all of the foregoing patents, the weighted pendulum is pivotally supported on a pin. This type of pendulum support possesses an inherent amount of friction which tends to interfere with achieving of a true horizontal or true vertical positioning.

SUMMARY OF THE INVENTION

To overcome the disadvantages of the conventional spirit levels, the present invention is an improved level for determining the true horizontal or true vertical by electronic circuitry which is adapted to provide visual and aural indications to the person using the level. The improved level uses one or more attitude detectors which are incorporated in the level frame. Since the conventional levels employ a large sturdy frame made of metal or wood, typically two to four feet in length, with a great amount of empty space within the perimeters of the frame, the attitude detectors may be easily placed within the unused space of such frame, while still retaining the conventional spirit-level tubes.

The present apparatus comprises four main components:

(1) A gross position sensor which automatically turns an associated electronic circuit off and on,
(2) Fine attitude detectors which sense the true horizontal and the true vertical,
(3) An electronic circuit for converting the attitude findings of the detector into suitable electrical signals, and
(4) A speaker, an indicator light or both for communicating these findings to the user.

The gross position sensor is essentially a mercury switch which shuts off all current from the power supply (a battery) until the level is near horizontal or near vertical, at which time the electrical power is actually needed. This switch makes it unnecessary for the user to repeatedly turn the apparatus off and on manually and it prevents unnecessary battery drain.

The attitude detector employs a miniature plumb which is free to swing back and forth through a narrow plane of infra-red light which is adapted to be received by an infra-red light receptor which senses the interruption of the light at any moment when the plumb line is interposed between the light and the receptor, thereby blocking the transmission of light from the light emitter to the light receptor. The light receptor provides an output connected to an electronic circuit which performs several functions such as (1) wave shaping, (2) signal discrimination (optional), (3) tone production, and (4) amplification.

In one embodiment, a separate detector is used for each direction which is to be measured. Thus, a pair of detectors would be used to measure the true vertical and the true horizontal. In a further embodiment, a single detector, having a rotatable element, may be used to read directions in both vertical and horizontal planes.

The main object of the invention is to provide a level for measuring true horizontal and true vertical directions and to give readings for each by a light or sound indication or both.

Another object of the invention is to improve the accuracy of a spirit level having an elongated frame by incorporating therein one or more attitude detectors.

A further object of the invention is to provide a sensitive detector for measuring an attitude.

A still further object of the invention is to provide a sensitive detector capable of measuring two attitudes.

A still further object of the invention is to provide a combination of two detectors adapted to measure the true horizontal of a plane.

A still further object of the invention is to provide an apparatus for automatically maintaining a level position of an object which is subjected to physical disturbances.

BRIEF DESCRIPTION OF THE DRAWINGS

FIG. 12 shows the incorporation of an apparatus for automatically maintaining a beam in a horizontal; and FIG. 12 illustrates a plumb with indicated measured constants which will vary depending on the size of the attitude detector.

DESCRIPTION OF THE PREFERRED EMBODIMENTS

Figure 1:
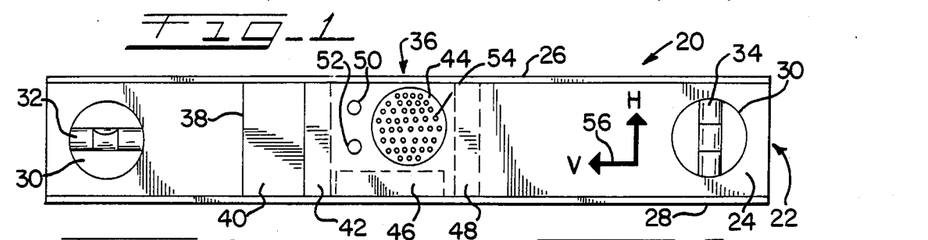
FIG. 1 is a side view of a conventional spirit level provided with an improved attitude detecting device.

Referring to FIG. 1, there is shown a level 20 comprising a frame 22 having an "I"-beam construction having a web 24 interconnecting a pair of flanges 26 and 28. Adjacent each end of the frame, there are openings 30 provided with spirit vials 32 and 34 for respectively indicating horizontal and vertical positions. To improve the attitude sensing of the level 20 so far described, an attitude detecting apparatus 36 is incorporated in a mid section of the frame 22 and comprises a compartment 38 closed by a cover 40, a printed circuit board 42 (containing all the electronic components shown in FIG. 9), signal means in the form of a speaker 44, a vertical direction measuring detector 46, a horizontal direction measuring detector 48 and a pair of LEDs 50 and 52. The LED (light emitting diode) 50 indicates "power on" (red) and the LED 52 indicates "on true" (green). The compartment 38 contains sensitivity, tone and volume adjustments, as well as a battery (not shown). The adjustments and replacement of the battery are made by removing the cover 40. The speaker 44 is centrally mounted and projects sound forward and backward, that is on both sides of the web 24. The speaker is protected on both sides by metal grills 54. An indicia 56 is imprinted on the web 24. The purpose of the indicia 56 is to enable the user to use the level 20 correctly. For example, the level 20, as shown in FIG. 1, would be used to measure horizontal direction, as indicated by the arrowhead pointing to "H". To measure a vertical direction, the level 20 would be rotated clockwise so that the arrowhead pointing to "V" will be in a vertical position.

Figure 2A:
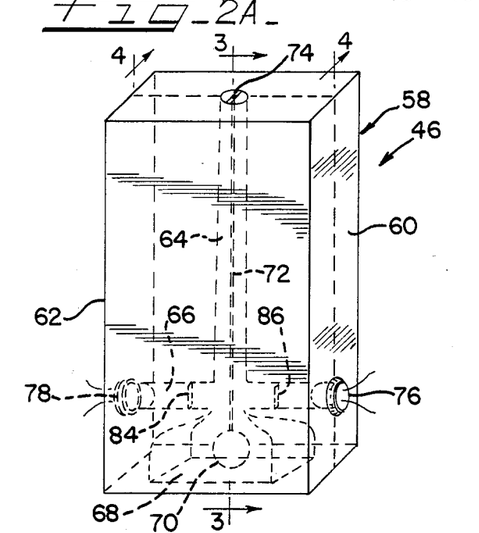
FIG. 2A is a perspective view of an attitude detector utilizing a plumb principle and how the plumb is interiorly supported.
Figure 2B:
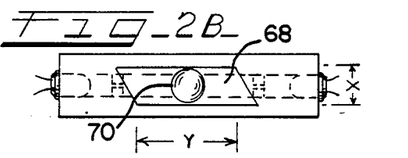
FIG. 2B is a bottom view of the detector shown in FIG. 2A.
Figure 3:
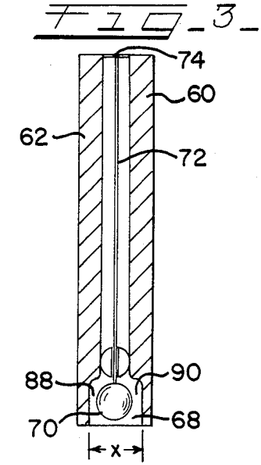
FIG. 3 is a sectional view of the detector in FIG. 2 taken along the lines 3—3.
Figure 4:
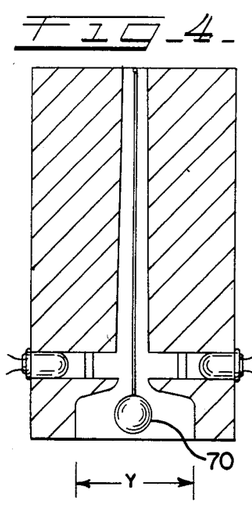
FIG. 4 is a sectional view of the detector shown in FIG. 2 taken along the lines 4—4.
Figure 5:
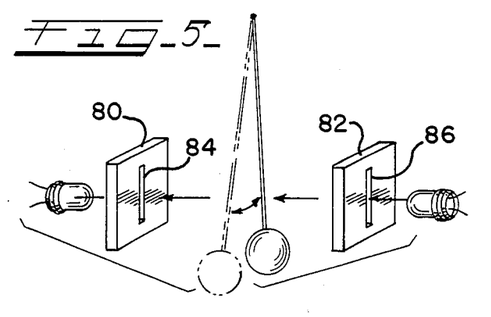
FIG. 5 is a pictorial view of light interception by a swinging plumb.

The heart of the invention lies in the use of the detectors 46 and 48, both of which have the same construction as shown in FIGS. 2-4. For example, the detector 46 comprises a housing 58 formed from two parts 60 and 62 formed from plastic material. As shown in FIG. 2A, the interiors of the housing parts 60 and 62 is provided with grooves which face each other and define a vertical channel 64 and another set of grooves which define a transmission or beam path in the form of a horizontal channel 66. The channels 64 and 66 communicate with each other. The vertical channel 64 terminates in a chamber 68 in which is suspended plumb means in the form of a plumb bob 70 supported by a plumb line 72 secured to a point 74 at the top of the housing 58. The housing 58 is made from an opaque plastic, such as DELRIN (Tm), in order to shield the detector from external sources of infra-red radiation. One end of the horizontal channel 66 is provided with an infra-red emitter 76 and the other end of the channel is provided with an infra-red receptor 78. Interposed in the horizontal channel 66 is a pair of masks 80 and 82 each provided respectively with individual, vertically extending, apertures 84 and 86, as best viewed in FIG. 5. Alternatively, the two housing parts 60 and 62 may be so molded so that each housing part partially defines an aperture so that, when the housing parts are assembled together, the partially formed apertures define the complete apertures 84 and 86. The diameter of the plumb line 72, which preferably is a multi-filament thread made from black polyester material, must be equivalent to the width of the apertures 84 and 86 to effectively interrupt the transmission of light from the emitter 76 to the receptor 78. The plumb bob 70 is a stainless steel ball having a ¼" diameter and being secured to the plumb bob 70 by glueing or by having the plumb line 72 pass through a fine tubular opening in the exact center of the ball 70. The distance from the fixed point 74 to the bottom of the ball is about two or three inches. The emittor 76 transmits an infra-red radiation which passes through both of the apertures 86 and 84 to be received by the receptor 78. The emitter 76 and the receptor 78 and the two apertures 84 and 86 must all be aligned precisely in order to create a uniform plane of relatively strong infra-red light. Each aperture is approximately 0.006 inch wide and 3/16" inch long. The plumb line 72 must be at least 0.006 inch in diameter, but accuracy will be greatest if it is not much larger than 0.006 inch (for example, 0.007 inch). A plumb line having a diameter less than 0.006 inch would not completely occlude the infra-red beam as the plumb line and the attached plumb bob swings across the transmission path existing between the apertures 84 and 86. The two apertures are about ¼" apart and must be perfectly aligned to insure that the plane of the light they form is a full 0.006 inch wide from top to bottom. These apertures must also align properly with the plumb line 72 so that the intersection of the plumb line and the plane of light at the moment of the true vertical is a line and not a point, which would result in an imperfect interception of the transmitted light beam.

Referring to the FIGS. 2–4, the vertical channel 64 is less than ¼" in diameter so that the ball 70 cannot enter into the channel. The chamber 68 at the bottom of the housing 58 is designed to limit the motion of the ball 70 in both the x and y directions, as identified in FIGS. 3 and 4 and also as indicated in FIG. 2B. The parallelogram shape of the chamber 68, as shown in the bottom view of the housing 68 in FIG. 2B insures that if the ball 70 swings to the extremes along the y-axis it will veer to one side and not cause a false "on true" reading. On the other hand, it should be noted that it is the movement of the plumb line 72 along the x-axis that determines the true horizontal or true vertical readings. Furthermore, it should be noted that the movement of the plumb line 72 along the x-axis, as best viewed in FIG. 3, is, in the nature of a pendulum, completely independent of the movement along the y-axis, as best viewed in FIG. 4. In other words, the plumb line may be swinging freely along the y-axis but still be at rest from the perspective of the infra-red receptor 78 which is capable of detecting motion only along the x-axis.

When the plumb line 72 shows a true vertical, for example as shown in FIG. 3, the ball 70 occupies a centered position along the x-axis with gaps 88 and 90 between the ball 70 and the walls defining the chamber 68. These gaps 88 and 90 define the limit of movement of the ball 70. The size of the gaps 88 and 90 have to be determined accurately to insure that the plumb line 72 will be allowed to move out of the beam of light just enough to completely clear the beam. The determination of the gap sizes will be discussed later in reference to a TABLE describing the different physical dimensions of the various physical constants utilized in the construction of the housing 58, the plumb bob 70 and the plumb line 72. The pendulum swinging of the ball 70 is restricted by the gaps 88 and 90 to prevent a protracted period of free oscillation of the plumb, that is, the maximum arc of the plumb along the x-axis is restricted to less than 1/32 inch. The combination of the horizontal channel 66, the emitter 76 and the receptor 78 constitutes beam means.

In reference to FIG. 4, it can be seen that the freedom of movement of the plumb bob 70 along the y-axis is considerably greater than along the x-axis. This permits the user to measure the horizontality of a line contained on a slightly sloped plane (for example, a roof).

Figure 7:
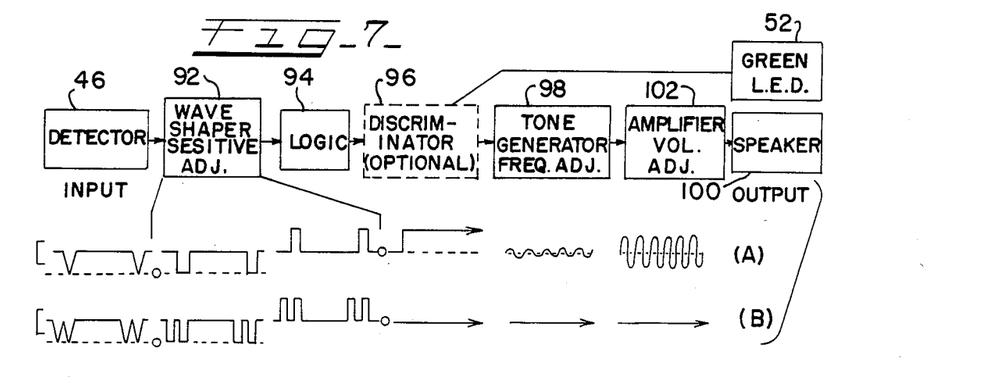
FIG. 7 is a block diagram of the electronic circuitry and illustrates two wave forms, A and B, developed thereby.

The output from the detectors, for example, detector 58, is coupled to an electronic circuit which, for this immediate discussion, is identified by a block diagram shown in FIG. 7. The output of the detector 46 is coupled to a wave shaper 92 which provides an output to a logic circuit 94. The output from the logic circuit can be further modified by connecting it to a discriminator 96 which provides one output to the green LED 52 and another output to a tone generator 98, the output of which is applied to a speaker 100 via an amplifier 102. In the alternative, the discriminator 96 can be dispensed with and the output from the logic circuit 94 may be fed directly to the green LED 52 and the tone generator 98. The effect that the electronic circuit block diagram has on shaping the output derived from the detector 46 can be visualized by the various wave forms shown in lines (A) and (B) of FIG. 7. Line (A) illustrates an "on true" signal, that is, when the plumb rythmically intercepts a centered light beam, and line (B) illustrates an "off true" signal, that is, the plumb is oscillating and intermittently interrupting an off-center light beam. The receptor 78 is an infra-red photo-transistor which will show a sudden drop in output as the plumb line passes between it and the infra-red emitter 76 which is actually a LED (light emitting diode). However, in a true sense, this is not an instantaneous change as the plumb line progressively moves across the light beam. Though the drop in signal may take only a one hundredth of a second, the light beam is gradually shut out and then gradually restored causing the inverted "V" peaks shown in the wave forms shown below the detector 46.

The wave shaper 92 is an operational amplifier that functions to convert the analog output of the detector 46 to a digital pulse (either on or off).

The operational amplifier is a comparator which operates like a switch that opens (or closes) when the input signal drops below (or exceeds) a chosen threshold voltage. The comparator also serves to invert the pulses. The interruption of the light beam by the plumb causes a cessation of the output, but it is also desirable to have the same event result ultimately in the initiation of the output, so an inversion must be accomplished somewhere in the circuit. As shown in FIG. 7, lines (A) and (B), the output from the detector 46 having a spike wave form had been converted to square pulses and also inverted, as shown underneath the wave shaper 92. The logic circuit simply channels signals from the two separate detectors into one circuit.

If the discriminator 96 is employed, the output from the logic circuit 94 can be interpretted and the output from the discriminator 96 will be either a continuous pulse or an absence of pulse. These two possible outcomes will occur when the plumb has finally come to a rest, as shown in FIGS. 6D and 6E. If the plumb shows a true vertical, as illustrated in FIG. 6D the light beam will be completely intercepted by the plumb line 72 and the discriminator 96 will provide a continuous pulse which is applied to the green LED 52 causing it to illuminate and the other portion of the output is applied to the tone generator 98 (provided with a frequency adjustment) and on to the amplifier 102 (provided with a volume control) and finally applied to the speaker 100 which will give an aural indication to the user.

If the plumb comes to a rest and is "off center" as shown in FIG. 6E, there will be no pulse generated by the discriminator, thereby informing the user that the level is "off center".

Figure 6A:
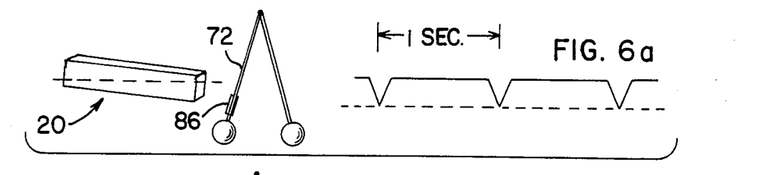
FIG. 6A is a graphic representation illustrating the electrical wave form resulting from swinging movement of the plumb bob of a detector of this invention mounted on a level which is in an attitude which is considerably different than a true horizontal attitude.
Figure 6B:
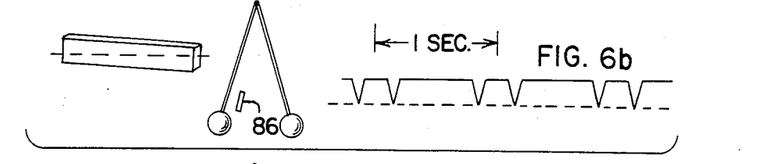
FIG. 6B illustrates the wave form which results from swinging movement of the plumb bob when the level is in an attitude closer than that shown in FIG. 6A to a true horizontal attitude.
Figure 6C:
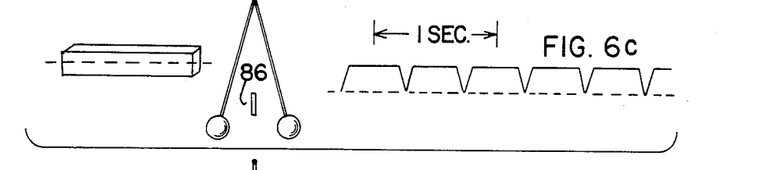
FIG. 6C illustrates the wave form which results from swinging movement of the plumb bob when the level is in a substantially true horizontal attitude.
Figure 6D:
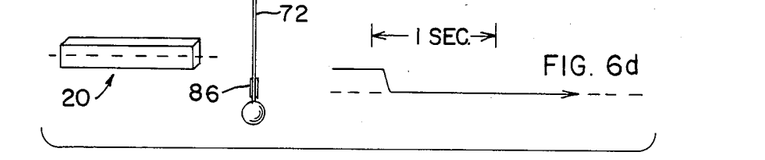
FIG. 6D illustrates the continuous pulse which results when the level is in a substantially true horizontal attitude and the plumb bob has come to rest in a substantially true vertical position.
Figure 6E:
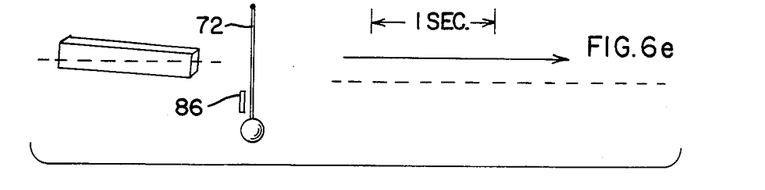
FIG. 6E illustrates the lack of pulse which results when the level is in an attitude which is not horizontal and the plumb bob comes to rest in a position which is "off-center"

FIGS. 6A, 6B and 6C show the various attitudes which can be assumed by the level and the respective pulse patterns that result as the plumb swings back and forth. The aperture 86 from which a plane of light is emitted is shown in various position to correspond to the various attitudes that the level 20 may assume. It should be noted that these illustrations shows the arcs of the plumb greatly exaggerated, when in reality, the arc is less than $\frac{1}{2}$ of a degree.

In FIG. 6A, as the plumb line 72 occludes the aperture 86, a spike pulse is generated with a long interval as the plumb swings to the right and then swings back to the left. If the aperture 86 is in a median range, as shown in FIG. 6B, the plumb will generate two spike pulses which will be separated by a long interval from another pair of spike pulses. If the level 20 indicates a "true direction", the aperture 86 will be in the middle of the arc defined by the swinging plumb thereby providing an output of equally spaced spiked pulses which would be effective to provide a uniform aural output at the speaker 100. Eventually, the plumb will come to a rest in the position shown in FIG. 6D to occlude the passage of the beam from the aperture 86, thereby no output is provided by the detector. In FIG. 6E, as previously explained, if the level 20 is "off center", a continuous beam will be transmitted, thereby providing a continuous output, which can be interpretted by the discriminator 96.

Since the level 20 is constantly used during construction, wherein the user senses the true direction and then puts aside the level to complete a course of construction, such as in brick laying, it would be an exceeding difficulty for the user to constantly turn a switch on and off every time the level is picked up and placed on a side. Since a switch which is manually operable would be difficult to manipulate in cold weather, a gravitationally actuable switch is incorporated in the level and which will actuate the electronic circuitry only when the level is placed in a measuring position.

Figure 8A:
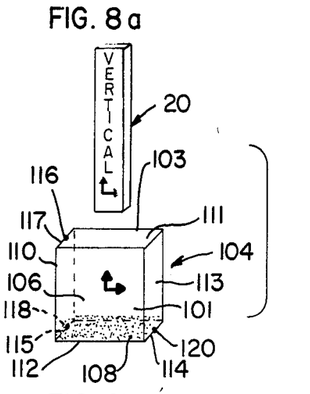
FIG. 8A shows the construction of a mercury type switch and how it functions when mounted on a level which is, as illustrated, in a vertical attitude.
Figure 8B:
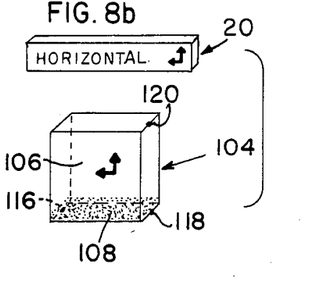
FIG. 8B shows the function of the switch of FIG. 8A when the level is in a horizontal attitude.
Figure 8C:
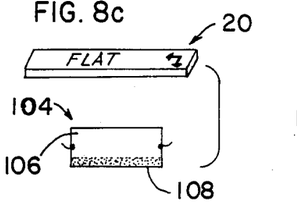
FIG. 8C shows the function of the switch of FIG. 8A when the level is in a "flat" attitude, such as being laid on its back surface.
Figure 8D:
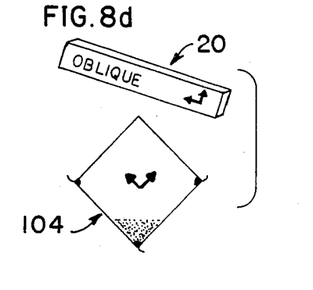
FIG. 8D shows the function of the switch of FIG. 8A when the level is in an oblique or non-vertical and non-horizontal position.
Figure 9:
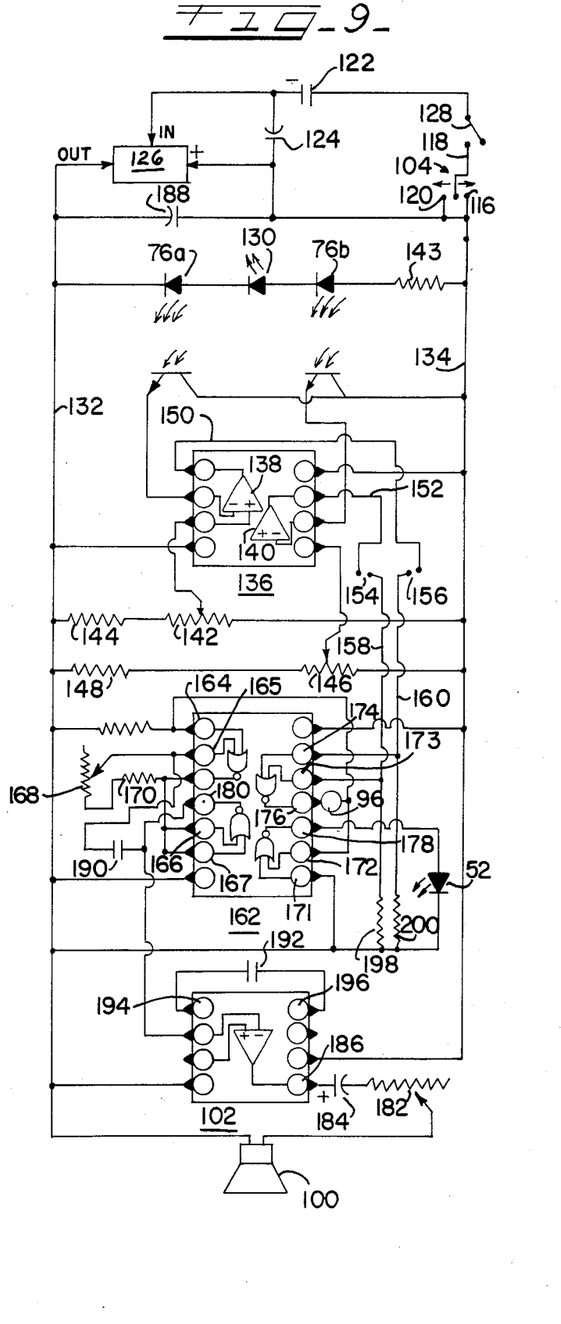
FIG. 9 is a circuit diagram for developing visual and aural indications from the outputs received from the detectors.

Referring to FIG. 8A, there is shown a specially designed mercury switch which will close to provide power to the circuit only when the level is near-horizontal or near-vertical. A mercury switch 104 is in the form of a hollow rectangular cube 105 made from non-electrically conductive material, having a chamber 106 containing a small pool of mercury 108. The cuboid 105 comprises a pair of spaced apart major walls 101 and 103 interconnected by minor walls 110-113. Corners 114, 115, and 117 are provided with mid-positioned terminals 116, 118, and 120, respectively, the terminals having portions inside the cube adapted to be contacted by the mercury. The view in FIG. 8A shows how the switch 104 will rest when the level 20 is in the vertical position. FIG. 8B shows the position of the switch 104 when the level is horizontal. FIG. 8C shows the position of the mercury pool 108 when the level is placed flat on either of its broad sides. In this position, the mercury pool 108 does not touch any of the terminals, thereby the circuit (as shown in FIG. 9) connected to the mercury switch 104 is not energized. FIG. 8D shows the position of the mercury switch 104 when the level 20 is oblique. Again, in this position, the circuit is open because the mercury touches only one contact 112.

The circuit shown in FIG. 9 uses a battery 122, preferably having an output of from 6 to 9 volts, coupled through an electrolytic capacitor 124 to a voltage regulator 126 which is designed to provide a uniform 5 volt output. The voltage regulator insures that the characteristics of the circuit do not change (including the light output of the infra-red LEDS) even as the battery begins to weaken. A manual switch 128 connects the positive terminal of the battery 122 to the terminal 118 of the mercury switch 104 so that a voltage may be applied to either of the terminals 116 and 120. The mercury switch 104 closes when the attitude of the level 20 is approximately horizontal or vertical. Current is then supplied to the entire circuit. Since the level described in FIG. 1 possesses a pair of detectors 46 and 48, there are two emitters 76a and 76b (infra-red LEDS) which activate receptors 78a and 78b (infra-red photo-transistors) which act as switches and amplifiers. The emitters 76a and 76b are serially connected with a LED 130 and a resistor 143 (red) across leads 132 and 134. It should be remembered that one emitter and one receptor is placed in each detector housing, one detector functioning as an indicator for the "true horizontal" and the other for the "true vertical". The receptors 78a and 78b are coupled to a dual operational amplifier 136 which includes comparators 138 and 140 which effectively convert an analog input to a digital output (shaping of the pulses). A potentiometer 142 is connected in series with a resistor 144 across the LEDS 132 and 134. Similarly, a potentiometer 146 is connected in series with a resistor 148 across the leads 132 and 134. The potentiometers 142 and 146 are used to adjust the threshold voltages for the comparators 138 and 140. This effectively determines the sensitivity of the detector circuit. The outputs from the comparators 138 and 140 are connected by leads 150 and 152, respectively, through conventional mercury switches 154 and 156 to leads 158 and 160 which are coupled to a quad-NOR-gate 162. The function of each of the mercury switches 154 and 156 is to switch off the output of the detectors whenever any one of them is not in the immediate position in which it was designed to operate. This prevents stray signals from the detectors whenever their respective plumb lines 72 are slack, for example as the plumb lines lie on their side. The gate 162 performs two functions: it acts as a tone generator when it receives inputs on terminals 164-167. A potentiometer 168 in series with a resistor 170 couples the terminal 165 to terminals 166 and 167, the potentiometer 168 determining the frequency of the tone. The gate 162 also provides logic (input terminals 171-174). If the discriminator 96 is used, it is connected between terminal 176 and input terminals 164 and 172. An output terminal 178 on the gate 162 supplies current to the green LED 52. An output terminal 180 on the gate 162 is coupled to the amplifier 102 to supply a tone to the amplifier. A potentiometer 182 is connected in series with a capacitor 184 between a terminal 186 on the amplifier 102 and the speaker 100. The potentiometer 182 functions as a volume control. The red LED 130 glows whenever the power is on, when switches 128 and 104 are both closed.

A capacitor 188 is connected across the output and the positive terminal of the voltage regulator 126. A capacitor 190 is connected across the terminals 165 and 180 of the gate 162. A capacitor 192 is connected across terminals 194 and 196 on the amplifier 102. The leads 158 and 160 are connected respectively through resistors 198 and 200 to lead 132.

Figure 10:
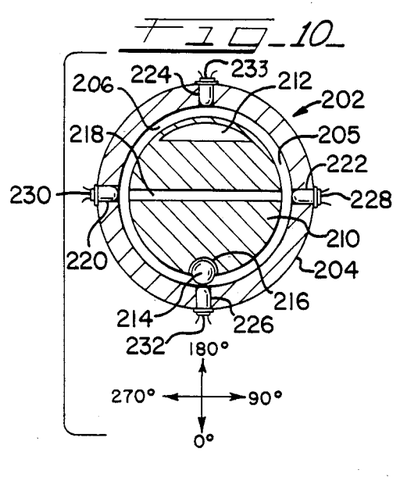
FIG. 10 is a sectional view of a modified detector capable of reading the true vertical or the true horizontal.

Another embodiment of a detector is shown in FIG. 10, which detector has a dual capability of establishing "true horizontal" and "true vertical". A detector 202 comprises a spherical hollow casing 204 having an internal chamber 206 filled with a fluid such as alcohol 208 and floatingly supporting a ball 210 made of black plastic material and provided with a closed air space 212 which keeps the ball upright. The ball 210 is kept from rising to the top and contacting the casing 204 by being ballasted by a rotatably supported steel ball 214 journalled in a seat 216 and located diametrically opposite to the center of the air space 212. As shown, the ball 210 has a demarcating clear plastic layer 218 defining a transmission layer and subdividing the black plastic material composing the ball into two parts. The clear plastic layer 218, which is about 0.010 inch thick, forms a transparent horizontal plane. The casing 204 has a pair of diametrically disposed apertures 220 and 222 in the section view shown in FIG. 10 and defining locations at 90° and 270°. The casing 204 also has a pair of diametrically opposed transmission paths in the form of apertures 224 and 226 defining positions at 0° and 180°. Disposed in the aperture 222 is an infra-red emitter 228 which is adapted to function with a receptor 230 which is diametrically disposed in the aperture 220. Similarly, an infra-red emitter 232 is mounted in the aperture 226 and is adapted to function with a receptor 233 supported in the aperture 224. The transmission paths when aligned with the transmission layer establish a signal or beam path for the passage of radiation from the emitter to the receptor.

The detector 202 would be mounted generally in the mid-portion of the level frame 22 shown in FIG. 1 and would replace the two detectors 46 and 48. This would be done by securing the casing 204 to the frame 22.

As described in reference to the first embodiment, the emitters 228 and 232 are infra-red LEDS which function to activate the receptors 230 and 233 which comprise photo-transistors.

As is apparent the spherical casing 204 would be fixed to the frame 22 of the level and would move with the frame. Since the plastic ball 210 (with the clear plastic layer 218) maintains its orientation with respect to gravity as the spherical casing 204 revolves around it, the infra-red beam must be brought into alignment with the clear plastic layer 218, which always remains horizontal, before the light can be received by the infra-red phototransistors 230 and 233. One or the other of the two receptors 230, 232 will be activated when the surrounding casing 204 is at 0°, 90°, 180° and 270°, so that a light beam will be transmitted through the clear plastic layer 218 to thereby generate a signal to be coupled to the described circuit which will provide an output to previously indicate true horizontal and true vertical.

As has been described so far, the detectors 46 and 48 are rigidly mounted on the level 20. Also, the detector 202 shown in FIG. 10 was also described as being rigidly mounted on the level. Of course, it would be obvious to mount the detectors supported in a bearing assembly which would permit rotatable movement of the detectors with respect to the frame 22 of the level 20. The assembly would be provided with indicia to indicate the movement of the supported detectors in degrees with respect to the frame 22. The foregoing arrangement would permit the user to obtain various angular declinations other than the 0°, 90°, and 270°.

Another application for the detector 46 . . . , the plumb line.

Figure 11:
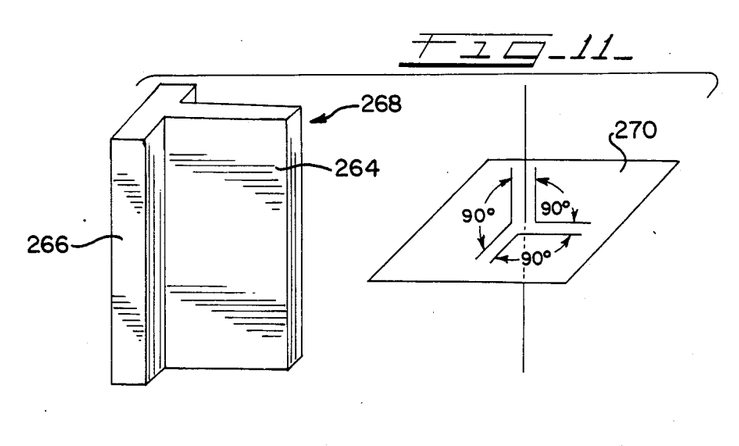
FIG. 11 is a perspective view of a pair of detectors arranged for giving a reading of the horizontal condition of a plane.

Another application for the detectors described in reference to FIG. 1 is in establishing or indicating the levelness of a plane rather than a line, as was the case in the builder's level described herein above. Referring to FIG. 11, a plane levelling device 268 comprises a detector 264 is arranged abutting another detector 266 to provide a "T-configuration" which is adapted to be placed on a surface of a plane or a flat surface of an object which it is desired to maintain in a level condition. For example, if the leveling device 268 is placed on the surface of a plane 270, the signal output of the two detectors, as previously described, would be coupled to an electronic circuit, for example as shown in FIG. 9 to generate visual and aural signals to the user of the device 268 so that the levelness of the plane 270 can be adjusted to achieve the desired horizontal planar disposition.

The leveling device 268 would be applied, for example, to a laboratory table or the base of a piece of machinery which must be kept perpendicular to the vertical in all directions. In this arrangement each detector 264 and 266 would produce different tone to give indication of unevenness. When both tones sound at the same time, the plane is adjudged to be horizontally planar.

In the previous discussion of the detector 46 shown in FIGS. 2–3, it was indicated that a certain physical relationship has to be maintained between the diameter or thickness of the plumb line 72 and the apertures 84 and 86. Since the sizes of the detector housings 58 may vary, the following discussion in reference to FIG. 12 and the following TABLE will give an indication of the relationships between the physical constants of the construction of the detector. For example, the dimensions for the plumb bob, plumb line and the aperture are given below in the TABLE for detector housings having a height of 2½ inches and 3 inches.

TABLE

Figure 12:
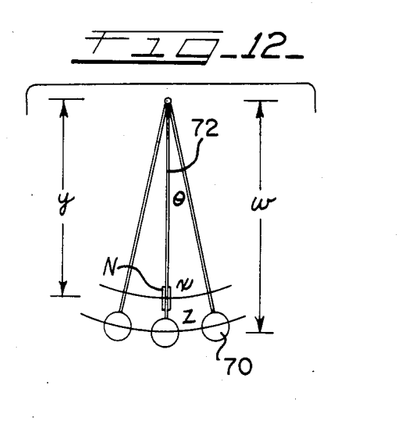

| H | M | N | P | χ | tan Θ x/y | Θ | Z |
|---|---|---|---|---|---|---|---|
| 2½" | .016 | .006 | .016 | .019 | .0095 | .54° | .022 |
| (y = 2") | .009 | .006 | .009 | .012 | .0060 | .34° | .014 |
| (w = 2 5/16") | .006 | .006 | .006 | .009 | .0045 | .26° | .010 |
| 3" | .009 | .006 | .009 | .012 | .0048 | .28° | .014 |
| (y = 2½") | .006 | .006 | .006 | .009 | .0036 | .21° | .010 |
| (w = 2 13/16") | | | | | | | |

IDENTIFICATION FOR SYMBOLS:
H = Height of detector housing (inches)
M = Plumb line thickness (inches)
N = Width of aperture (inches)
P = Clearance on either side of aperture (inches)
χ = P + ½ N
Θ = Angle in degrees (also theoretical accuracy)
Z = Gap (for example gap 88) (inches)
w = Length of the plumb line + ½ diameter of the plumb bob (inches)

The limits of movement of the plumb bob 70, as shown in FIG. 12, are determined by the width of the gap 88 between the bob 70 (at center position) and a wall in the chamber 68, as viewed in FIG. 3. The size of the gap 88 is specified and identified as Z in the above TABLE. Gap Z is determined quite precisely to insure that the plumb line 72 will be allowed to move out of the beam of light just enough to completely clear the beam. This limit is placed on the bob 70 and the plumb line 72 to prevent a protracted period of free oscillation of the plumb. The maximum arc of the plumb along the X axis is restricted to less than 1/32nd inch. The implication of this close tolerance can be seen in the bottom line for each of the sizes of the detector housings in the TABLE. The swing of the plumb line 72, for example, in a housing having a height of 3 inches, from side to side describes an arc of only 0.21 degrees (or about 1/5th of a degree) where the plumb line thickness is 0.006 inch, the aperture is 0.006 inch width and the gap is 0.010 inch. This means that if any signal pulse pattern is produced by the detector built with these specifications (and excluding the optional discriminator circuit), the user can be sure that the deviation from the true horizontal or vertical is no more than 1/5 of a degree. Furthermore, a constant tone or silence is achieved quickly (even when the discriminator circuit is omitted).

In one of the embodiments that were constructed, the electrical components used in the electronic circuit shown in FIG. 9 possessed the electrical values as shown in the List:

| LIST | | |
|---|---|---|
| capacitor | 188 | 1 microfarad, 16 v. electrolytic |
| " | 124 | 2.2 microfarad, 16 v. electrolytic |
| " | 190 | 0.22 microfarad, disc |
| " | 192 | 0.22, disc |
| " | 184 | 22 microfarad, 16 v. electrolytic |
| resistor | 143 | 0-100 ohm, ¼ volt |
|  | 144 | k5K ohm, ¼ watt |
| " | 148 | 15K ohm, ¼ volt |
| " | 198 | 1 megohn, ¼ volt |
| " | 200 | 1 megohn, ¼ volt |
| potentiometer | 142 | 10K ohm |
| " | 146 | 10K ohm |
| " | 168 | 5K ohm |
| " | 182 | 500 ohm |
| emitter LED | 76a | Infra-red, high output, XC880-A |
| emitter LED | | |
| emitter LED | 76b | Infra-red, high output, XC880-A |
| emitter LED green | 52 | |
| emitter LED red | 130 | |
| speaker | 100 | 8 ohm |
| receptor | 78a | Infra-red photo-transistor, T1L 414 |
| " | | |
| receptor | 78b | Infra-red photo-transistor, T1L 414 |
| regulator | 126 | 5 volts, REG 7905 |
| amplifier | 136 | dual operational amplifier 1458 |
| " | | |
| logic | 162 | Quad-Nor-Gate logic, 4001 |
| amplifier | 102 | audio amplifier LM386 0.4 watts |
| " | | |
| switch | 104 | position sensing mercury switch |
| " | | |
| " | 154 | position sensing mercury switch |
| " | 156 | position sensing mercury switch |

Although various embodiments of the invention have been described with some particularity, many modifications and variations in the invention are possible within the light of the above teachings. It is, therefore, to be understood that, within the scope of the appended claims the invention may be practiced other than specifically described.

I claim:

1. An angular orientation detector for detecting an angular orientation of an object with respect to the earth's gravitational center, said detector comprising, in combination:
   a housing having a vertically extending chamber, said chamber having a top portion;
   means for emitting a beam of radiation, said beam emitting means being positioned for emitting a beam of radiation defining one beam path extending through a portion of said chamber;
   means for receiving a beam of radiation, said beam receiving means being positioned for receiving a beam of radiation emitted along said beam path by said beam emitting means;
   plumb means freely suspended from said top portion of said chamber for being swingable across said chamber for coming to rest in a position for blocking said beam path when said detector is at a preselected angular orientation for substantially preventing said beam receiving means from receiving radiation from said beam emitting means; and
   electrically actuated means for emittiing a signal, said signal means being actuated in response to a substantial absence of radiation being received by said beam receiving means upon said plumb means blocking said beam path whereby said signal means indicates said detector is at said preselected angular orientation.

2. The invention defined in claim 1 in which said plumb means is a plumb bob supported by a plumb line and said plumb line blocks said beam path when said detector is at said preselected angular orientation.

3. The invention defined in claim 1 in which said plumb line is a thread.

4. The invention defined in claim 3 in which said thread is a multi-filament thread.

5. The invention defined in claim 1 together with a frame of a level and said detector is mounted on said frame for indicating a preselected angular orientation of said level.

6. The invention defined in claim 5 in which said detector is mounted on said level for indicating the horizontal orientation of said level.

7. The invention defined in claim 5 in which said detector is mounted on said level for indicating the vertical orientation of said level.

8. The invention defined in claim 2 in which said vertical chamber is comprised of an upper portion and a lower portion and said lower portion is larger than said upper portion for enabling said plumb bob to swing in said lower portion of said chamber.

9. The invention defined in claim 8 in which said beam path is defined through said upper portion of said chamber and said plumb bob is too large to enter said upper portion of said chamber.

10. The invention defined in claim 1 together with a pair of vertically extending aperture means for shaping said beam of radiation into a beam having a narrow width.

11. The invention defined in claim 10 in which said plumb line has a diameter at least equal to the width of said beam.

12. The invention defined in claim 1 in which said beam of radiation is a beam of infra-red light.

13. The invention defined in claim 12 in which said housing is formed of a material opaque to said infra-red light.

14. The invention defined in claim 1 together with circuit means electrically connecting said beam emitting means, said beam receiving means and said electrically actuated signaling means.

15. The invention defined in claim 14 together with a source of electric power connected to said circuit means for selectively energizing said means.

16. The invention defined in claim 15 together with gravitationally actuable switch means for selectively energizing said circuit means in response to the attitude of said switch means.

17. The invention defined in claim 1 in which said signal emits an audible signal to indicate said detector is at a preselected angular orientation.

18. The invention defined in claim 1 in which said signal means emits a visual signal to indicate said detector is at a preselected angular orientation.

19. The invention defined claim 1 together with a second detector and said detectors are arranged in an abutted relationship with said beam paths being transverse to each other for indicating the levelness of a plane.

* * * * *